US010626286B2

(12) United States Patent
Liao et al.

(10) Patent No.: US 10,626,286 B2
(45) Date of Patent: Apr. 21, 2020

(54) LOW-VOC-EMISSION WATERBORNE COATING HAVING HIGH HARDNESS AND GOOD ADHESION AND PROCESS FOR PRODUCING THE SAME

(71) Applicant: NAN YA PLASTICS CORPORATION, Taipei (TW)

(72) Inventors: Te-Chao Liao, Taipei (TW); Sen-Huang Hsu, Taipei (TW); Hung-Hsun Wu, Taipei (TW); Hui-Chun Chuang, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 122 days.

(21) Appl. No.: 15/817,346

(22) Filed: Nov. 20, 2017

(65) Prior Publication Data

US 2018/0142118 A1   May 24, 2018

(30) Foreign Application Priority Data

Nov. 22, 2016   (TW) .............................. 105138198 A

(51) Int. Cl.
*C09D 133/12* (2006.01)
*C08L 33/12* (2006.01)
*C09D 133/06* (2006.01)

(52) U.S. Cl.
CPC ............ *C09D 133/12* (2013.01); *C08L 33/12* (2013.01); *C09D 133/066* (2013.01); *C08L 2201/54* (2013.01)

(58) Field of Classification Search
CPC .... C09D 133/12; C09D 133/066; C08L 33/12
See application file for complete search history.

(56) References Cited

U.S. PATENT DOCUMENTS

| 4,151,143 A * | 4/1979 | Blank ................ C09D 151/003 524/533 |
| 6,313,218 B1 * | 11/2001 | Fiori .................. C08G 18/0804 516/67 |
| 6,316,543 B1 * | 11/2001 | Fiori .................. C08G 18/0804 516/925 |
| 6,395,820 B1 * | 5/2002 | Lindenmuth ........ C09D 175/04 524/501 |
| 2014/0378574 A1 | 12/2014 | Molnar et al. |

FOREIGN PATENT DOCUMENTS

| CN | 101173146 A | 5/2008 |
| CN | 102300924 A | 12/2011 |
| JP | 2012251062 A | 12/2012 |
| WO | 2012115691 A1 | 8/2012 |

OTHER PUBLICATIONS

Kojio et al. Synthesis and properties of highly hydrophilic polyurethane based on diisocyanate with ether group. Polymer 50 (2009) 3693-3697. (Year: 2009).*

* cited by examiner

*Primary Examiner* — John E Uselding
(74) *Attorney, Agent, or Firm* — Li & Cai Intellectual Property (USA) Office

(57) ABSTRACT

A low-VOC-emission waterborne coating is prepared from a waterborne acrylic emulsion, a hydrophilic cross-linking agent, a coalescing agent, additives and a pigment, and the waterborne acrylic emulsion is formed from performing emulsion polymerization on those reactive monomers including an alkyl-group-containing methyl acrylate, a hydroxyl-group-containing methyl acrylate, a carboxyl-group-containing methacrylic acid, a hydroxyl-group-containing acrylic polyester (polyether) polyol, and a methyl acrylate containing alkene-based unsaturated functional groups, which features high hardness, good adhesion, high luster, high acid resistance, high alkali resistance, good weatherability, high solvent resistance, high scrap resistance and high thermal shock resistance.

11 Claims, No Drawings

LOW-VOC-EMISSION WATERBORNE COATING HAVING HIGH HARDNESS AND GOOD ADHESION AND PROCESS FOR PRODUCING THE SAME

BACKGROUND OF THE INVENTION

1. Technical Field

The present invention relates to a waterborne coating, and more particularly to a colored low-VOC-emission waterborne paint or coating that features high hardness and good adhesion.

2. Description of Related Art

Presently, in the course of manufacturing and processing of solvent-based paints or coatings (hereinafter briefed as coating), such large quantities of solvents have no choice but to be emitted into the atmosphere. These solvents not only pollute the environment seriously, but are responsible for the greenhouse effect. Thus, how to minimize emission of volatile organic compounds (VOCs) has become an increasingly important issue to businesses producing waterborne coatings.

The commercially available waterborne coatings today can be roughly divided into thermal curable coating and ultraviolet-thermal curable coating, in which thermal-curable waterborne coatings are more competitively advantageous under cost consideration.

A known method for preparing thermal-curable waterborne coating involves synthesizing acrylic resin emulsion having a glass transition temperature (Tg) of greater than 60° C. by means of solution polymerization. Such a coating, when applied to plastics, displays excellent adhesion, as well as resistance to solvents and to warm water-whitening. However, for polymerization of acrylic resin emulsion, more organic solvents are required and this in turn leads to involve problems related to VOC emission.

Another known method for preparing thermal-curable waterborne coating is involved synthesizing acrylic resin using emulsion polymerization with isobornyl methacrylate monomers added for reaction. This kind of thermal-curable waterborne coating, when adhered to plastic base materials in application, can form a coating film having an acceptable hardness and endurance to adhere to the plastic base materials. However, the improved hardness for the coating film only has pencil hardness of 2H, based on a pencil scratch hardness test in accordance with ASTM-D3363, resulted in that the kind of coating is still insufficient for practical applications.

SUMMARY OF THE PRESENT INVENTION

The primary objective of the present invention is to provide a waterborne coating featuring both high hardness and good adhesion. Said waterborne coating is prepared by bonding different acrylic monomers with a reactive emulsifier into a waterborne acrylic emulsion, which is then cross-linked into the waterborne coating.

In particular, the waterborne coating of the present invention is a kind of environmentally friendly coating with a reduced VOC emission level, in application it is suitably adhered to a base material to form a coating film, since the coating film particularly has a pencil hardness up to 5H, based on a pencil scratch hardness test in accordance with ASTM D3363, as well as has an adhesiveness of 100% (100/100) by a 100 squares cross-cut test in accordance with ASTM D3359.

Another main objective of the present invention is to provide a waterborne acrylic emulsion, which is made by bonding a hydroxyl-group-containing acrylic polyester (polyether) polyol and a reactive emulsifier to an acrylic polymer using a special synthesis technique so as to synthesize the acrylic emulsion. The main material are acrylate monomers having high glass transition temperature (Tg) that work with reactive monomers having functional properties and improved by cross-linkable monomers, so that the synthesized emulsion has its molecules containing more polar groups, such as ester groups and amino groups, thereby possessing high cohesive force and adhesion as well as good scuff resistance, and thereby having its properties such as coating film hardness, adhesion, chemical resistance and gloss are effectively improved.

The waterborne acrylic emulsion of the present invention may be added with a wetting agent, a leveling agent, a defoaming agent, a pigment and a special hydrophilic cross-linking agent, so as to endow coating film with increased crosslinking density and more molecules, thereby formulating a low-VOC-emission environmentally friendly waterborne coating featuring high hardness, good adhesion, high luster, high acid resistance, high alkali resistance, good weatherability, high solvent resistance, high scrap resistance and high thermal shock resistance.

The waterborne coating of the present invention contains the following components in parts by weight:
a) 100 parts by weight of a waterborne acrylic emulsion (hereinafter abbreviated as 100 parts of a waterborne acrylic emulsion);
b) 1-30 parts of a hydrophilic cross-linking agent;
c) 0.1-30 parts of a coalescing agent;
d) 0.1-30 parts of additives; and
e) 0-50 parts of a pigment;
wherein the component a), i.e., the waterborne acrylic emulsion, is formed from performing emulsion polymerization on the following reactive monomers, based on a total weight of all the reactive monomers sum up to 100 wt %:
a1) 65-76 wt % of an alkyl-group-containing methyl acrylate;
a2) 8-10 wt % of a hydroxyl-group-containing methyl acrylate;
a3) 1-4 wt % of a carboxyl-group-containing methacrylic acid;
a4) 2-7 wt % of a hydroxyl-group-containing acrylic polyester (polyether) polyol, selected from any one of a hydroxyl-group-containing acrylic polyester polyol, a hydroxyl-group-containing acrylic polyether polyol or a blend thereof; and
a5) 13-20 wt % of monomers containing alkene-based unsaturated functional groups.

Another main objective of the present invention is to provide a process for producing a waterborne acrylic emulsion for use in making low-VOC-emission waterborne coating, comprising the following steps, based on 100 parts by weight of the total monomers:
a) preparing a first hydrophilic initiator aqueous solution by taking 0.3 parts of sodium persulfate to dissolve in 2 parts of deionized water;
b) preparing a first reaction tank and putting 90 parts of deionized water, 0.6 parts of sodium hydrogen carbonate, and 0.8-2.3 parts of emulsifier into the tank, heating the tank reached to temperature of 78° C. and then adding the first hydrophilic initiator aqueous solution of step a) into the tank and mixing for 20 more minutes;

c) preparing a second reaction tank and putting the following material into the tank and mixing them into a pre-emulsion having a C=C double bond structure through a mixer: 35 parts of deionized water, 1.0-2.5 parts of an emulsifier, 49-60 parts of methyl methacrylate (MMA), 0-25 parts of n-butyl methacrylate (n-BMA), 2-7 parts of 2-ethylhexyl acrylate (2-EHA), 4-6 parts of butyl acrylate (BA), 8-10 parts of 2-hydroxyethyl methacrylate (2-HEMA), 0-2 parts of 2-hydroxyethyl acrylate (2-HEA), 2 parts of acrylic acid (AA), 1 part of methacrylic acid (MAA), 0-2 parts by hydroxyl acrylic polyester (polyether) polyol, 0-14 parts of styrene (SM), 0-6 parts of methacrylic acid isobornyl methacrylate (IBOMA), 0-4 parts of cyclohexyl methacrylate (CHMA), and 0-1 parts by diacetone acrylamide (DAAM);

d) preparing a second hydrophilic initiator aqueous solution by taking 0.4 parts of sodium persulfate to dissolve in 17.5 parts of deionized water;

e) adding 24 parts of the pre-emulsion of step c) into the first reaction tank, and letting reaction run for 30 minutes to form a seeded emulsion; and f) dropwise adding the remaining pre-emulsion of step c) into the first reaction tank kept the temperature held at 78° C., letting reaction run for 2 hours; and g) dropwise adding second hydrophilic initiator aqueous solution of step d) into the first reaction tank of step f) within 2 hours, letting reaction run for another 2 hours, and cooling the first reaction tank to 40° C. or below; and adding ammonia to neutralize the solution to pH 7-8, cooling to the ambient temperature, thereby obtaining the waterborne acrylic emulsion containing a solid constituent up to 42%.

DETAILED DESCRIPTION OF THE INVENTION

A process for producing a waterborne acrylic emulsion of the present invention is prepared by adding an initiator aqueous solution into a primary reaction tank in two batches as described below:

I. The first batch is to produce ionomers that form a seeded emulsion with a pre-emulsion, and II. The second batch is to ensure that the seeded emulsion increases layer by layer and forms a solid structure.

The process for producing the waterborne acrylic emulsion of the present invention comprises the following steps, based on 100 parts by weight of the total monomers:

a) Preparing Hydrophilic Initiator Aqueous Solution A:

Taking 0.3 parts by weight of sodium persulfate (SPS) as a hydrophilic initiator and dissolving it in 2 parts by weight of deionized water, thereby obtaining an initiator aqueous solution A;

b) Adding 90 parts by weight of deionized water, 0.6 parts by weight of sodium hydrogen carbonate, and 0.8-2.3 parts by weight of emulsifier into a first reaction tank, after stirred, rising the temperature in the first reaction tank to 78° C., adding the prepared hydrophilic initiator aqueous solution A, and mixing for 20 more minutes;

c) Preparing Pre-Emulsion C:

In a second reaction tank, adding 35 parts by weight of deionized water, 1.0-2.5 parts by weight of an emulsifier, 49-60 parts by weight of methyl methacrylate (MMA), 0-25 parts by weight of n-butyl methacrylate (n-BMA), 2-7 parts by weight of 2-ethylhexyl acrylate (2-EHA), 4-6 parts by weight of butyl acrylate (BA), 8-10 parts by weight of 2-hydroxyethyl methacrylate (2-HEMA), 0-2 parts by weight of 2-hydroxyethyl acrylate (2-HEA), 2 parts by weight of acrylic acid (AA), 1 part by weight of methacrylic acid (MAA), 0-2 parts by weight of hydroxyl acrylic polyester (polyether) polyol, 0-14 parts by weight of styrene (SM), 0-6 parts by weight of methacrylic acid isobornyl methacrylate (or called isobornyl methacrylate, IBOMA), 0-4 parts by weight of cyclohexyl methacrylate (CHMA), and 0-1 parts by weight of diacetone acrylamide (DAAM), and mixing into a pre-emulsion C through a mixer;

d) Preparing Hydrophilic Initiator Aqueous Solution D:

Dissolving 0.4 parts by weight of sodium persulfate (SPS) of the hydrophilic initiator into 17.5 parts by weight of deionized water, thereby obtaining an initiator aqueous solution D;

e) Adding 24 parts by weight of the pre-emulsion C into the first reaction tank, and letting reaction run for 30 minutes to form a seeded emulsion; and f) Dropwise adding the remaining pre-emulsion C into the first reaction tank with the temperature held at 78° C., letting reaction run for 2 hours, dropwise adding hydrophilic initiator D into the first reaction tank in 2 hours, letting reaction run for another 2 hours, and cooling to 40° C. or below, adding ammonia to neutralize the solution to pH 7-8, cooling to the ambient temperature, thereby obtaining the emulsion containing a solid constituent up to 42%.

The disclosed waterborne acrylic emulsion is synthesized from acrylate monomers and a reactive emulsifier using a special technique. It is in fact a product of emulsion polymerization of deionized waters, acrylate monomers, initiators, a reactive emulsifier having a C=C double bond structure and a pH buffer solution as its main components.

Materials involved in producing waterborne acrylic emulsion of the present invention are further described in detail as follows:

Deionized Water

Emulsion polymerization requires deionized water. If there are metal ions or salts in water, since micelles may be formed in the emulsifier, the stability of polymer particles will be adversely affected and agglomeration of the polymer can happen. To avoid polymeric agglomeration, the deionized water used must have a pH value between six and eight, a total hardness of zero, and conductivity below ten.

Acrylate Monomers

Different acrylate monomers have different functional groups and different molecular weights as well as different glass transition temperature (Tg). Their formulas directly determine the coating's physical properties, further including hardness. Acrylate monomers used in the present invention includes:

1. Alkyl-Group-Containing Methyl Acrylate:

The alkyl-group-containing methyl acrylate is any one or a blend of two or more selected from methyl methacrylate (MMA), ethyl acrylate (EA), propyl acrylate (PA), n-butyl acrylate (BA), isobutyl acrylate (IBA), pentyl methacrylate, hexyl methacrylate, heptyl methacrylate, octyl methacrylate, 2-ethylhexyl methacrylate (2-EHMA), n-octyl methacrylate (OA), iso-octyl methacrylate (IOA), nonyl methacrylate (NA), decyl methacrylate, lauryl methacrylate (LA), octadecyl methacrylate, methoxyethyl methacrylate (MOEA), n-butyl methacrylate (n-BMA), 2-ethylhexyl acrylate (2-EHA), and (methyl) ethoxy methacrylate (EOMAA).

The alkyl-group-containing methyl acrylate is used for mainly adjusting the resin structure of the emulsion, providing proper glass transition temperature (Tg), enhancing adhesion of coating film to its base material, and giving high luster, high hardness, chubbiness and good weatherability.

2. Hydroxyl-Group-Containing Methyl Acrylate:

The hydroxyl-group-containing methyl acrylate is any one or a blend of two or more selected from 2-hydroxyethyl methacrylate (2-HEMA), 2-hydroxyethyl acrylate (2-HEA), 4-hydroxybutyl acrylate (4-HBA), 2-hydroxy-3-chloropropyl acrylate and diethylene glycol methacrylate (DGEMMA).

The hydroxyl-group-containing methyl acrylate is used for increasing crosslinking density of the emulsion and improving the coating film's chemical resistance.

3. Carboxyl-Group-Containing Methacrylic Acid:

The carboxyl-group-containing methacrylic acid is any one or a blend of two or more selected from acrylic acid (AA), methacrylic acid (MAA), maleic acid (MA), fumaric acid (FA), itaconic acid (IA), butenic acid (BA) and maleic anhydride (MAH).

The carboxyl-group-containing methacrylic acid is used for enhancing adhesion to the base material.

4. Hydroxyl-Group-Containing Acrylic Polyester (Polyether) Polyol;

The hydroxyl-group-containing acrylic polyester (polyether) polyol is selected from any one of a hydroxyl-group-containing acrylic polyester polyol, a hydroxyl-group-containing acrylic polyether polyol or a blend thereof. And, the acrylic polyurethane emulsion when synthesized from hydroxyl-group-containing acrylic polyester (polyether) polyol has excellent properties, is extensively suitable to many base materials, supports versatility of products, and is highly adaptable to form coating for most applications. Particularly, the produced coating film is advantageously pliable yet tough, hard, and has high gloss and high adhesion to various base materials.

In practical application, the hydroxyl-group-containing acrylic polyester (polyether) polyol is any one or a blend of two or more availably selected from DOW SPECFLEX NC-630, SPECFLEX NC-701, VORANOL 2070, VORANOL 3943A, VORALUX HL-431, VORALUX HN-395, VORALUX HF-4001, VORALUX WH-4043, VORANOL CP-6001 and VORANOL WK-3140, all being manufactured by and available from the DowDuPont Inc.

However, the hydroxyl-group-containing acrylic polyester (polyether) polyol of the present invention is not limited to those above-mentioned hydroxyl-group-containing acrylic polyester (polyether) polyols, and any acrylic polyester (polyether) polyol else having hydroxyl groups can be used.

5. Monomers Containing Alkene-Based Unsaturated Functional Groups:

In addition to the foregoing monomers, without deteriorating the scope of the present invention, a methyl acrylate containing alkene-based unsaturated functional groups may be added for co-polymerization; the methyl acrylate containing alkene-based unsaturated functional groups is any one or a blend of two or more monomers selected from vinyl acetate (VAC), styrene (SM), methyl styrene (MSM), vinyl toluene, methacrylonitrile (AN), diacetone acrylamide (DAAM), N-hydroxypropyl acrylamide (N-MAAM), cyclohexyl methacrylate (CHMA) and methacrylic acid isobornyl methacrylate (IBOMA), for improving coating film's hardness, alcohol resistance, heat resistance, weatherability and adhesion to the base material.

Emulsifier

How to select the emulsifier forms a feature of the present invention and is done according to the following four factors: (1) polymerization rate and conversion rate; (2) polymeric particle size; (3) coating film's properties; and (4) the emulsion's stability.

The emulsifier used in the present invention is a reactive emulsifier having a C=C double bond structure. There are anionic and non-ionic emulsifiers. An anionic emulsifier may be used alone or used together with a non-ionic emulsifier.

In the present invention, the emulsifier is added in two batches (stages). In the first stage, the amount of the initiating emulsifier is 0.8-2.3 wt % of the total reactive monomers. In the second stage, the emulsifier equal to 1.0-2.5 wt % of the total reactive monomers is added to form a pre-emulsion. The two-stage addition of the emulsifier facilitate even and fast emulsion polymerization.

The anionic emulsifiers include a reactive anionic emulsifier and a non-reactive anionic emulsifier. Therein, the reactive anionic emulsifier is SR-10 from Adeka Corporation in Japan, PC-10 from Sanyo Chemical Industries, Ltd., in Japan, MS-2N from Sino-Japan Chemical in Japan, NOIGEN RN-20, RN-30 or RN-50 from Chin Yee Chemical Industrial Co., Ltd. In Taiwan, SDBS95 from Big Sun Chemical Corporation in Taiwan, Maxmul-6112 from Ching Tai Resins Chemical Co., Ltd. In Taiwan, LATEMUL PS and LATEMUL ASK from Kao (Taiwan) Corporation in Taiwan. The reactive anionic emulsifier is NP6SF or SDS from Jiuh Yi Chemical Industrial Co., Ltd. in Taiwan.

The non-ionic emulsifiers include a reactive non-anionic emulsifier and a non-reactive non-anionic emulsifier. Therein, the reactive non-anionic emulsifier is 5010 from Ching Tai Resins Chemical Co., Ltd. In Taiwan, and the non-reactive non-anionic emulsifier is E-950 from Sino-Japan Chemical in Japan.

Initiator

Most initiators for emulsion polymerization are water-soluble, which is one or more selected from the group consisting of hydrogen peroxide, sodium persulfate, ammonium persulfate, potassium persulfate, sodium bisulfite, sodium metabisulfite and sodium hydrosulfite.

Coalescing Agent

The coalescing agent used in the present invention is mainly a coalescing agent containing glycol ethers. The coalescing agent is any one or a blend of two or more selected from propylene glycol monomethyl ether (PM), dipropylene glycol monomethyl ether (DPM), tripropylene glycol methyl ether (TPM), 1-propoxy-2-propanol (PnP), propylene glycol n-butyl ether (PnB), dipropylene glycol n-butyl ether (DPnB), tripropylene glycol n-butyl ether (TPnB), propylene glycol monomethyl ether acetate (PMA), dipropylene glycol monomethyl ether acetate (DPMA), dipropylene glycol dimethoxy ether (DMM), 2-butoxyethanol (EB) and butyl diglycol (DB).

The adding amount of coalescing agent is usually ranged from 0.1 to 30 parts by weight, preferably from 1 to 20 parts by weight, and more preferably from 2 to 10 parts by weight, based on 100 parts by weight of the acrylic emulsion.

Pigment

The pigment used in the present invention is colors, which may be organic colors or inorganic colors. It serves to cover the original color of the base material. For meeting various requirements for colors, one or two or more pigments may be blended to use. The inorganic colors is selected from titanium dioxide colors, chromium-based colors, iron oxide colors, an arkansite and a carbon black, and the organic colors is selected from azo colors or phthalocyanine colors.

The pigment may include filler(s) in addition to the colors. The filler may act as an extender pigment, including transparent fillers (such as feldspar, silica sand, limestone, etc.), color fillers (such as marble powder, granite stone powder, fluorite, etc.), expanders (such as calcium carbonate, talcum powder and barium sulfate) etc.

The adding amount of the pigment is usually ranged from 0 to 50 parts by weight, preferably from 10 to 40 parts by weight, more preferably from 15 to 25 parts by weight, based on 100 parts by weight of the acrylic emulsion.

Additives

The additives used in the present invention include a leveling agent, a wetting agent, a defoaming agent, an anti-mildew agent, a stabilizer, an antibacterial agent, an antioxidant, a dispersant, a matting agent, a thixotropic agent, an adhesion promoter and a thickener. One or more additives may be used.

The wetting agent added for coating is any one or a blend of two or more selected from BYK-346, BYK-333 (available from BYK-Chemie GmbH), TEGO-410 (available from Evonik Resource Efficiency GmbH) or W-461 (available from Deuchem Shanghai Chemical Co., Ltd.).

The adding amount of the additives is usually ranged from 0 to 30 parts by weight, preferably from 2 to 20 parts by weight, more preferably from 5 to 15 parts by weight, based on 100 parts by weight of the acrylic emulsion.

Hydrophilic Cross-Linking Agent

The hydrophilic cross-linking agent used in the present invention is selected from commercialized products including hydrophilic isocyanate-based compounds, hydrophilic epoxy compounds, amine-based compounds, metal chelating compounds and aziridine-based compounds, and is preferably a cross-linking agent using a hydrophilic isocyanate-based compound.

The isocyanate-based compound is an isocyanate monomer or an isocyanate compound as a product of addition reaction between an isocyanate monomer and trimethylolpropane (TMP). Alternatively, it is selected from isocyanates of the type of amine-ester prepolymers from additional reaction such as polyether polyols, polyester polyols, acrylic polyols, polybutadiene polyols, polyisoprene polyol and so on and melamine resin. Therein, the isocyanate monomer is any one or a blend of two or more selected from toluene diisocyanate, chlorophenyl diisocyanate, hexamethylene diisocyanate, tetramethylene diisocyanate, isophorone diisocyanate, xylylene diisocyanate, methylenediphenyl diisocyanate, and hydrogenated methylenediphenyl diisocyanate. The isocyanate compound is an isocyanuric esterified compound or a biuret-based compound.

The adding amount of the cross-linking agent is usually ranged from 1 to 30 parts by weight, preferably from 2 to 25 parts by weight, more preferably from 10 to 20 parts by weight, based on 100 parts by weight of the acrylic emulsion.

Examples discussed below are for illustrating the contents and effects of the present invention in detail without limiting the scope of the present invention.

[Pre-Making Acrylic Emulsion for "Waterborne Coating"]

<Emulsion Sample P1>

1. Preparing Pre-Emulsion

As shown in Table 1, 90 parts by weight of deionized water, 0.6 parts by weight of sodium hydrogen carbonate, and 2.3 parts by weight of Emulsifier SDS were placed into a reaction tank and stirred. The reaction tank was heated to 78° C., and the hydrophilic initiator, 0.3 parts by weight of sodium persulfate (SPS) was dissolved in 2 parts by weight of deionized water and the mixture was stirred for 20 more minutes. Deionized water 35 parts by weight, 2.5 parts by weight of reactive emulsifier SR-10, 60 parts by weight of methyl methacrylate (MMA), 5 parts by weight of n-butyl methacrylate (n-BMA), 3 parts by weight of 2-ethylhexyl acrylate (2-EHA), 4 parts by weight of butyl acrylate (BA), 8 parts by weight of 2-hydroxyethyl methacrylate (2-HEMA), 2 parts by weight of acrylic acid (AA), 1 part by weight of methacrylic acid (MAA), 2 parts by weight of hydroxyl acrylic polyester (polyether) polyol (NC-701), 8 parts by weight of styrene (SM), 2 parts by weight of isobornyl methacrylate (IBOMA), 4 parts by weight of cyclohexyl methacrylate (CHMA), and 1 part by weight of diacetone acrylamide (DAAM) were mixed into a pre-emulsion using a mixer.

2. Preparing Emulsion Sample P1

24 parts by weight of the pre-emulsion was placed into the reaction tank and reaction was run for 30 minutes, so as to form a seeded emulsion. The remaining pre-emulsion was dropwise added into the reaction tank while the temperature was held at 78° C. After 2 hours of reaction, 0.4 parts by weight of the hydrophilic initiator, sodium persulfate (SPS), was dropwise added and dissolved in 17.5 parts by weight of deionized water in the reaction tank within 2 hours. Reaction was run for 2 more hours and the reactant was cooled to 40° C. or below Ammonia was then added to neutralize the reactant to pH=7-8. The reactant was further cooled to the ambient temperature, thereby obtaining an emulsion (P1) containing a solid constituent up to 42%.

<Emulsion Sample P2>

1. Preparing Pre-Emulsion

As shown in Table 1, the pre-emulsion preparation for Emulsion Sample P1 was performed, but in the process, 4 parts by weight of n-butyl methacrylate (n-BMA), 2 parts by weight of 2-ethylhexyl acrylate (2-EHA), 1 part by weight of hydroxyl acrylic polyester (polyether) polyol (NC-701), 1 part by weight of hydroxyl acrylic polyester (polyether) polyol (HF-4001) and 10 parts by weight of styrene (SM) were used instead thereby obtaining pre-emulsion.

2. Preparing Emulsion Sample P2

The pre-emulsion preparation for Emulsion Sample P1 was performed, thereby obtaining an emulsion (P2) containing a solid constituent up to 42%.

<Emulsion Sample P3>

1. Preparing Pre-Emulsion

As shown in Table 1, the pre-emulsion preparation for Emulsion Sample P1 was performed, but in the process, without using cyclohexyl methacrylate (CHMA), 7 parts by weight of n-butyl methacrylate (n-BMA), 2 parts by weight of 2-ethylhexyl acrylate (2-EHA), 2 parts by weight of hydroxyl acrylic polyester (polyether) polyol (NC-701), 1 part by weight of hydroxyl acrylic polyester (polyether) polyol (HF-4001), 9 parts by weight of styrene (SM) and 3 parts by weight of isobornyl methacrylate (IBOMA) were used instead thereby obtaining pre-emulsion.

2. Preparing Emulsion Sample P3

The pre-emulsion preparation for Emulsion Sample P1 was performed, thereby obtaining an emulsion (P3) containing a solid constituent up to 42%.

<Emulsion Sample P4>

1. Preparing Pre-Emulsion

As shown in Table 1, the pre-emulsion preparation for Emulsion Sample P1 was performed, but in the process, without using n-butyl methacrylate (n-BMA) and hydroxyl acrylic polyester (polyether) polyol (NC-701), 2 parts by weight of 2-ethylhexyl acrylate (2-EHA), 5 parts by weight of butyl acrylate (BA), 1 part by weight of hydroxyl acrylic polyester (polyether) polyol (HF-4001), 2 parts by weight of hydroxyl acrylic polyester (polyether) polyol (2070) and 12 parts by weight of styrene (SM) were used instead, thereby obtaining pre-emulsion.

2. Preparing Emulsion Sample P4

The pre-emulsion preparation for Emulsion Sample P1 was performed, thereby obtaining an emulsion (P4) containing a solid constituent up to 42%.

<Emulsion Sample P5>

1. Preparing Pre-Emulsion

As shown in Table 1, the pre-emulsion preparation for Emulsion Sample P4 was performed, but 1.5 parts by weight reactive emulsifier SR-10 was used instead of SDS as the initiating reactive material. In the process, instead of using hydroxyl acrylic polyester (polyether) polyol (HF-4001) and isobornyl methacrylate (IBOMA), 2.0 parts by weight reactive emulsifier SR-10, 9 parts by weight of 2-hydroxyethyl methacrylate (2-HEMA), 1 part by weight of hydroxyl acrylic polyester (polyether) polyol (2070), 1 part by weight of hydroxyl acrylic polyester (polyether) polyol (WK-3140), 14 parts by weight of styrene (SM), and 3 parts by weight of cyclohexyl methacrylate (CHMA) were used instead, thereby obtaining pre-emulsion.

2. Preparing Emulsion Sample P5

The pre-emulsion preparation for Emulsion Sample P4 was performed, thereby obtaining an emulsion (P5) containing a solid constituent up to 42%.

<Emulsion Sample P6>

1. Preparing Pre-Emulsion

As shown in Table 1, the pre-emulsion preparation for Emulsion Sample P5 was performed, without using hydroxyl acrylic polyester (polyether) polyol (2070), hydroxyl acrylic polyester (polyether) polyol (WK-3140) and cyclohexyl methacrylate (CHMA), 8 parts by weight of n-butyl methacrylate (n-BMA), 7 parts by weight of 2-ethylhexyl acrylate (2-EHA) and 7 parts by weight of styrene (SM) were used instead, thereby obtaining pre-emulsion.

2. Preparing Emulsion Sample P6

The pre-emulsion preparation for Emulsion Sample P5 was performed to obtain an emulsion (P6) containing a solid constituent up to 42%.

<Emulsion Sample P7>

1. Preparing Pre-Emulsion

As shown in Table 1, the pre-emulsion preparation for Emulsion Sample P6 was performed, but the initiating reactive material was not reactive emulsifier SR-10. Instead, 1.6 parts by weight of Reactive Emulsifier PC-10 was used. In the process, instead of Reactive Emulsifier SR-10, 2.5 parts by weight Reactive Emulsifier PC-10, 56 parts by weight of methyl methacrylate (MMA), 12 parts by weight of n-butyl methacrylate (n-BMA), 6 parts by weight of 2-ethylhexyl acrylate (2-EHA), 5 parts by weight of butyl acrylate (BA), 10 parts by weight of 2-hydroxyethyl methacrylate (2-HEMA), 3 parts by weight of styrene (SM) and 4 parts by weight of isobornyl methacrylate (IBOMA) were used thereby obtaining pre-emulsion.

2. Preparing Emulsion Sample P7

The pre-emulsion preparation for Emulsion Sample P6 was performed, thereby obtaining an emulsion (P7) containing a solid constituent up to 42%.

<Emulsion Sample P8>

1. Preparing Pre-Emulsion

As shown in Table 1, the pre-emulsion preparation for Emulsion Sample P7 was performed, but in the process 54 parts by weight of methyl methacrylate (MMA), 15 parts by weight of n-butyl methacrylate (n-BMA), 4 parts by weight of 2-ethylhexyl acrylate (2-EHA), 6 parts by weight of butyl acrylate (BA), 1 part by weight of styrene (SM), and 6 parts by weight of isobornyl methacrylate (IBOMA) were used instead, thereby obtaining a pre-emulsion.

2. Preparing Emulsion Sample P8

The pre-emulsion preparation for Emulsion Sample P7 was performed, thereby obtaining an emulsion (P8) containing a solid constituent up to 42%.

<Emulsion Sample P9>

1. Preparing Pre-Emulsion

As shown in Table 1, the pre-emulsion preparation for Emulsion Sample P7 was performed, but the initiating reactive material was not Reactive Emulsifier PC-10, but 0.8 parts by weight of Non-Ionic Emulsifier E950 and 1.2 parts by weight Anionic Emulsifier NP6SF. In the process, without using Reactive Emulsifier PC-10, hydroxyl-group-containing polyester (polyether) acrylic polyol (D) and methyl acrylate containing alkene-based unsaturated functional groups (E), 1.5 parts by weight Non-Ionic Emulsifier E-950, 1.0 parts by weight Anionic Emulsifier NP6SF, 49 parts by weight of methyl methacrylate (MMA), 25 parts by weight of n-butyl methacrylate (n-BMA), 7 parts by weight of 2-ethylhexyl acrylate (2-EHA), 6 parts by weight of butyl acrylate (BA), 8 parts by weight of 2-hydroxyethyl methacrylate (2-HEMA) and 2 parts by weight 2-hydroxyethyl acrylate (2-HEA) were used instead, thereby obtaining pre-emulsion.

2. Preparing Emulsion Sample P9

The pre-emulsion preparation for Emulsion Sample P7 was performed, thereby obtaining an emulsion (P9) containing a solid constituent up to 42%.

TABLE 1

| | | | Sample No. Acrylic Emulsion Sample for Waterborne Coating | | | | | | | | |
|---|---|---|---|---|---|---|---|---|---|---|---|
| | unit: parts by weight | | P1 | P2 | P3 | P4 | P5 | P6 | P7 | P8 | P9 |
| Starting Reaction | deionized water | | 90 | 90 | 90 | 90 | 90 | 90 | 90 | 90 | 90 |
| | sodium bicarbonate | | 0.6 | 0.6 | 0.6 | 0.6 | 0.6 | 0.6 | 0.6 | 0.6 | 0.6 |
| | Emulsifier | SDS | 2.3 | 2.3 | 2.3 | 2.3 | | | | | |
| | | SR-10 | | | | | 1.5 | 1.5 | | | |
| | | PC-10 | | | | | | | 1.6 | 1.6 | |
| | | E-950 | | | | | | | | | 0.8 |
| | | NP6SF | | | | | | | | | 1.2 |
| Solution A | deionized water | | 2 | 2 | 2 | 2 | 2 | 2 | 2 | 2 | 2 |
| | hydrophilic initiator SPS | | 0.3 | 0.3 | 0.3 | 0.3 | 0.3 | 0.3 | 0.3 | 0.3 | 0.3 |
| Pre-emulsion | deionized water | | 35 | 35 | 35 | 35 | 35 | 35 | 35 | 35 | 35 |
| | Emulsifier | SR-10 | 2.5 | 2.5 | 2.5 | 2.5 | 2.0 | 2.0 | | | |
| | | PC-10 | | | | | | | 2.5 | 2.5 | |
| | | E-950 | | | | | | | | | 1.5 |
| | | NP6SF | | | | | | | | | 1.0 |

TABLE 1-continued

|  |  |  | Sample No. Acrylic Emulsion Sample for Waterborne Coating | | | | | | | | |
|---|---|---|---|---|---|---|---|---|---|---|---|
| unit: parts by weight | | | P1 | P2 | P3 | P4 | P5 | P6 | P7 | P8 | P9 |
| Acrylate Monomers | $A^1$ | MMA | 60 | 60 | 60 | 60 | 60 | 60 | 56 | 54 | 49 |
|  |  | n-BMA | 5 | 4 | 7 |  |  | 8 | 12 | 15 | 25 |
|  |  | 2-EHA | 3 | 2 | 2 | 2 | 2 | 7 | 6 | 4 | 7 |
|  |  | BA | 4 | 4 | 4 | 5 | 5 | 5 | 5 | 6 | 6 |
|  | $B^2$ | 2-HEMA | 8 | 8 | 8 | 8 | 9 | 9 | 10 | 10 | 8 |
|  |  | 2-HEA |  |  |  |  |  |  |  |  | 2 |
|  | $C^3$ | AA | 2 | 2 | 2 | 2 | 2 | 2 | 2 | 2 | 2 |
|  |  | MAA | 1 | 1 | 1 | 1 | 1 | 1 | 1 | 1 | 1 |
|  | $D^4$ | NC-701 | 2 | 1 | 2 |  |  |  |  |  |  |
|  |  | HF-4001 |  | 1 | 1 | 1 |  |  |  |  |  |
|  |  | 2070 |  |  |  | 2 | 1 |  |  |  |  |
|  |  | WK-3140 |  |  |  |  | 1 |  |  |  |  |
|  | $E^5$ | SM | 8 | 10 | 9 | 12 | 14 | 7 | 3 | 1 |  |
|  |  | IBOMA | 2 | 2 | 3 | 2 |  |  | 4 | 6 |  |
|  |  | CHMA | 4 | 4 |  | 4 | 3 |  |  |  |  |
|  |  | DAAM | 1 | 1 | 1 | 1 | 1 | 1 | 1 | 1 |  |
| Solution D | deionized water | | 17.5 | 17.5 | 17.5 | 17.5 | 17.5 | 17.5 | 17.5 | 17.5 | 17.5 |
|  | hydrophilic initiator SPS | | 0.4 | 0.4 | 0.4 | 0.4 | 0.4 | 0.4 | 0.4 | 0.4 | 0.4 |
| Emulsion Appearance | | | White with Slightly Transparent | | | | | | | | |
| Solid Constituent (%) | | | 42 | 42 | 42 | 42 | 42 | 42 | 42 | 42 | 42 |
| Average Particle Size (nm) | | | 76 | 82 | 75 | 78 | 81 | 78 | 110 | 76 | 91 |

Note:
[1] Acrylate monomer "A" represents an alkyl-group-containing methyl acrylate including methyl methacrylate (MMA), n-butyl methacrylate (n-BMA), 2-ethylhexyl acrylate (2-EHA), and n-butyl acrylate (BA);
[2] Acrylate monomer "B" represents a hydroxyl-group-containing methyl acrylate, including 2-hydroxyethyl methacrylate (2-HEMA) and 2-hydroxyethyl acrylate (2-HEA);
[3] Acrylate monomer "C" represents a carboxyl-group-containing methacrylic acid, including acrylic acid (AA) and methacrylic acid (MAA);
[4] Acrylate monomer "D" represents a hydroxyl-group-containing acrylic polyester (polyether) polyol, such polyol including DOW SPECFLEX NC-701, VORALUX HF-4001, VORANOL 2070 and VORANOL WK-3140, all available from The Dow Chemical Company;
[5] Acrylate monomer "E" represents Monomers containing alkene-based unsaturated functional groups, including styrene (SM), methacrylic acid isobornyl methacrylate (IBOMA), cyclohexyl methacrylate (CHMA) and diacetone acrylamide (DAAM).

Waterborne coatings being produced from the following examples and comparative examples is made from mixing one of the preformed synthesized Emulsion Samples P1-P9 with a hydrophilic cross-linking agent and various additives, and subsequently, to spray a corresponding waterborne coating product onto a SMC board, and after dried, to form a tested coating film sprayed on the SMC boards (hereinafter referred to as SMC coating film). The physical properties of these SMC coating films are then evaluated using method described below:

1. Test of Coating Film's Appearance

Appearance of the SMC coating film is visually evaluated under light. And, Evaluation criteria are ranked into two levels including "good" and "poor", each level is defined as follows:
a. Ranking of "good" indicates that the surface of the SMC coating film is even, smooth and free from defects such as chaps and coming off; and
b. Ranking of "poor" indicates that the surface of the SMC coating film is uneven, dull, having defects such as chaps and coming off.

2. Test of Adhesiveness of Coating Film to Base Material

Higher "adhesiveness" of the coating film means that the SMC coating film is more unlikely to come off from the surface of the SMC boards after the SMC coating film is adhered to the SMC boards.

The SMC coating film so prepared is evaluated by a 100 squares cross-cut test in accordance with ASTM D3359, where 100 squares each having a length of 1 mm and a width of 1 mm are regularly cross-cut on the SMC coating film of the SMC boards.

Then the UK Elcometer 99 tape was applied to the 100 square cross-cuts with all bubble removed. After 20 seconds, the tape was fast split off in a 180° direction. The number of the remaining squares on the coating film was counted.

3. Test of Coating Film's Hardness

The SMC coating film so prepared is measured for Film Hardness by Pencil Test in accordance with ASTM D3363.

A pencil hardness tester modeled No Cat. 3086 is used. A Mitsubishi pencil marked with its hardness values was loaded with a load of 500 g when contacting the SMC coating film to be tested at an inclined angle of 45 degrees and pushed along the specimen for 6.5 cm. Then an attempt was made to clean the scratch with an eraser.

The greatest hardness value among the panels whose scratches did not peel off or come off from the SMC coating film was read as the coating film's pencil scratch hardness value.

4. Test of Coating Film's Gloss

The SMC coating film so prepared is measured for their surface gloss using a gloss-haze meter VGS-300A with a sensing angle of 60 degrees.

5. Test of Coating Film's Alcohol Resistance

The SMC coating film so prepared is wiped using 95% ethanol. The coating films were visually evaluated for appearance. And, Evaluation criteria are ranked into three levels including "good", "not bad" and "poor", each level is defined as follows:
a. Ranking of "good" indicates that the surface of the SMC coating film is free from defects such as peeling off and coming off;
b. Ranking of "not bad" indicates that the surface of the SMC coating film is minor defects such as peeling off and coming off; and
c. Ranking of "poor" indicates that the surface of the SMC coating film is major defects such as peeling off and coming off.

6. Test of Coating Film's Acid Resistance

The SMC board having the SMC coating film so prepared is soaked into 10% hydrochloric acid for one day at room temperature. Then the SMC board is rinsed using water and set aside for drying at room temperature for 1 hour.

The SMC coating films were visually evaluated for appearance and measured for gloss. Gloss remained 80% as compared to the original specimen is the threshold of acceptability.

Evaluation criteria are ranked into three levels including "good", "not bad" and "poor", each level is defined as follows:
a. Ranking of "good" indicates that the surface of the SMC coating film is free from peeling off and coming off and more than 80% gloss as compared to the original specimen;
b. Ranking of "not bad" indicates that the surface of the SMC coating film is minor peeling off and coming off and less than 80% gloss as compared to the original specimen; and
c. Ranking of "poor" indicates that the surface of the SMC coating film is major peeling off and coming off and less than 80% gloss as compared to the original specimen.

7. Test of Coating Film's Alkali Resistance

The SMC board having the SMC coating film so prepared is soaked into a 5% alkaline sodium hydroxide solution at room temperature for one day. Then the boards were rinsed using water and set aside for drying at room temperature for 1 hour.

The SMC coating films were visually evaluated for appearance and measured for gloss. Gloss remained 80% as compared to the original specimen (or the pre-soaking specimen) is the threshold of acceptability.

Evaluation criteria are ranked into three levels including "good", "not bad" and "poor", each level is defined as follows:
a. Ranking of "good" indicates that the surface of the SMC coating film is free from peeling off and coming off and more than 80% gloss as compared to the original specimen;
b. Ranking of "not bad" indicates that the surface of the SMC coating film is minor peeling off and coming off and less than 80% gloss as compared to the original specimen; and
c. Ranking of "poor" indicates that the surface of the SMC coating film is major peeling off and coming off and less than 80% gloss as compared to the original specimen.

8. Test of Coating Film's Hot Water Resistance

The SMC board having the SMC coating film so prepared is soaked into hot water of 80° C. for 7 days and dried at the ambient temperature for 1 hour. The coating films were visually evaluated for appearance.

Evaluation criteria are ranked into three levels including "good", "not bad" and "poor", each level is defined as follows:
a. Ranking of "good" indicates that the surface of the SMC coating film is free from defects such as peeling off, bulging and coming off;
b. Ranking of "not bad" indicates that the surface of the SMC coating film is minor defects such as peeling off, bulging and coming off; and
c. Ranking of "poor" indicates that the surface of the SMC coating film is major defects such as peeling off, bulging and coming off.

9. Test of Coating Film's Thermal Shock Resistance

The SMC board having the SMC coating film so prepared is subject to a thermal shock tester set with the following course: shock at 25° C. for 1 hour, −20° C. for 6 hours, 25° C. for 1 hour, and 60° C. for 16 hours as one cycle. Five such cycles of test are conducted. The coating films were visually evaluated for appearance.

Evaluation criteria are ranked into three levels including "good", "not bad" and "poor", each level is defined as follows:
a. Ranking of "good" indicates that the surface of the SMC coating film is free from defects such as peeling off and coming off;
b. Ranking of "not bad" indicates that the surface of the SMC coating film is minor defects such as peeling off and coming off; and
c. Ranking of "poor" indicates that the surface of the SMC coating film is major defects such as peeling off and coming off.

10. Test of Coating Film's Weatherability

The SMC board having the SMC coating film so prepared is placed into a weathearability tester where they were exposed to a xenon arc lamp for 3500 hours. Afterwards, the coating film's appearances were visually evaluated and their color differences were measured by a color meter. Color change degree (zE) smaller than 7 is the threshold of acceptability.

Evaluation criteria are ranked into three levels including "good", "not bad" and "poor", each level is defined as follows:
a. Ranking of "good" indicates that the surface of the SMC coating film is free from peeling off and coming off, and color change degree (zE) greater than 7;
b. Ranking of "not bad" indicates that the surface of the SMC coating film is minor peeling off and coming off, and color change degree (iE) greater than 7; and
c. Ranking of "poor" indicates that the surface of the SMC coating film is major peeling off and coming off, and color change degree (iE) greater than 7.

Example 1

As shown in Table 2, Emulsion Sample P1 was taken as the waterborne acrylic emulsion. With the solid constituent of Emulsion Sample P1 defined as 100 parts by weight, 10 parts by weight of a hydrophilic isocyanate-based crosslinking agent XP2655 (from Bayer AG), 2 parts by weight of BYK-346, 3 parts by weight of BYK-093, 1.5 parts by weight of BYK-333, 4 parts by weight of DPM and 20 parts by weight of titanium dioxide ($TiO_2$) pigment paste were added, thereby obtaining Waterborne Coating Composition Solution A1.

Waterborne Coating Composition Solution A1 was sprayed on a brushed SMC board and dried at 70° C. to form a 25 m waterborne coating film on the SMC board.

The coating film were tested for its physical properties, including: appearance, gloss, adhesion to the base material, pencil scratch hardness, alcohol tolerance, acid resistance, alkali resistance, thermal shock resistance, hot water resistance, weatherability and pallet stacking suitability. The results are detailed in Table 2.

Examples 2 through 5 and Comparative Examples 1 Through 4

As shown in Table 2, Emulsion Samples P2-P9 were used as the waterborne acrylic emulsion. Preparation similar to that of Example 1 was performed, thereby obtaining Waterborne Coating Composition Solutions A2-A9.

Waterborne Coating Composition Solutions A2-A9 were sprayed on brushed SMC boards, respectively. After dried at 70° C., the solutions formed a 25m waterborne coating film on the respective SMC boards. The coating films were tested for their physical properties, and the results are detailed in Table 2.

Comparative Examples 5 Through 6

As shown in Table 2, Emulsion Sample P6 was used as the waterborne acrylic emulsion. Preparation similar to that of Example 1 was performed but 15 parts by weight or 10 parts by weight of a hydrophilic isocyanate-based cross-linking agent modeled WH2110 (from An Fong Development Co. Ltd.) was used instead of 10 parts by weight of the hydrophilic isocyanate-based cross-linking agent modeled XP2655 (from Bayer AG), thereby obtaining Waterborne Coating Composition Solutions A10 and A11. Waterborne Coating Composition Solutions A10 and A11 were sprayed on brushed SMC boards, respectively. After dried at 70° C., the solutions formed a 25 m waterborne coating film on the respective SMC boards. The coating films were tested for their physical properties, and the results are detailed in Table 2.

Also, the coating film is pliable yet tough, and is resistant to acid, alkali, hot water, weatherability and thermal shock, adding value to the product.

2. As shown in Table 2, the coating films of Comparative Examples 1-6 did not contain hydroxyl-group-containing acrylic polyester (polyether) polyols, so the synthesized acrylic emulsion showed low cohesive force, brittleness, and weak adhesion. While the coating films of Comparative Examples 1-3 also past the tests for acid resistance, alkali resistance, hot water resistance, weathearability and thermal shock resistance, they all had adhesion below 40% and their film hardness by pencil test in accordance with ASTM D3363 raged between 2H and 3H. The hardness was far lower than the required value of 5H.

What is claimed is:

1. A waterborne coating containing the following components in parts by weight:
    a) 100 parts by weight of a waterborne acrylic emulsion;
    b) 1-30 parts of a hydrophilic cross-linking agent;
    c) 0.1-30 parts of a coalescing agent;

TABLE 2

| | | Example | | | | | Comparative Example | | | | | |
|---|---|---|---|---|---|---|---|---|---|---|---|---|
| | | 1 | 2 | 3 | 4 | 5 | 1 | 2 | 3 | 4 | 5 | 6 |
| Emulsion Sample | P1 | 100 | | | | | | | | | | |
| | P2 | | 100 | | | | | | | | | |
| | P3 | | | 100 | | | | | | | | |
| | P4 | | | | 100 | | | | | | | |
| | P5 | | | | | 100 | | | | | | |
| | P6 | | | | | | 100 | | | | 100 | 100 |
| | P7 | | | | | | | 100 | | | | |
| | P8 | | | | | | | | 100 | | | |
| | P9 | | | | | | | | | 100 | | |
| Cross-linking agent | XP2655 | 10 | 10 | 10 | 10 | 10 | 10 | 10 | 10 | 10 | | |
| | WH2110 | | | | | | | | | | 15 | 10 |
| Additives | BYK 346 | 2 | 2 | 2 | 2 | 2 | 2 | 2 | 2 | 2 | 2 | 2 |
| | BYK 093 | 3 | 3 | 3 | 3 | 3 | 3 | 3 | 3 | 3 | 3 | 3 |
| | BYK 333 | 1.5 | 1.5 | 1.5 | 1.5 | 1.5 | 1.5 | 1.5 | 1.5 | 1.5 | 1.5 | 1.5 |
| | DPM | 4 | 4 | 4 | 4 | 4 | 4 | 4 | 4 | 4 | 4 | 4 |
| | $TiO_2$ | 20 | 20 | 20 | 20 | 20 | 20 | 20 | 20 | 20 | 20 | 20 |
| Coating Film Evaluation | Appearance | good | good | good | good | good | good | good | good | good | good | good |
| | Gloss | 65 | 62 | 58 | 52 | 55 | 48 | 50 | 52 | 48 | 47 | 52 |
| | Adhesion | 100 | 100 | 100 | 100 | 100 | 38 | 26 | 26 | 20 | 35 | 30 |
| | Pencil Hardness | 5H | 5H | 5H | 5H | 5H | 3H | 3H | 3H | 2H | 3H | 3H |
| | Alcohol Tolerance | good | good | good | good | good | good | good | good | not bad | good | good |
| | Acid Resistance | good | good | good | good | good | good | good | good | good | good | good |
| | Alkali Resistance | good | good | good | good | good | good | good | good | good | good | good |
| | Thermal Shock Resistance | good | good | good | good | good | good | good | good | not bad | not bad | not bad |
| | Hot Water Resistance | good | good | good | good | good | good | good | good | poor | good | good |
| | Weatherability | good | good | good | good | good | good | good | good | good | good | good |
| | Pallet Stacking Suitability | good | good | good | good | good | good | good | good | poor | not bad | not bad |

Results:

1. As shown in Table 2, the coating films of Examples 1-5 contained 2-3% hydroxyl-group-containing acrylic polyester (polyether) polyols, so that the synthesized emulsion has its molecules containing more ester groups and amino groups, thereby possessing high cohesive force and adhesion. With its excellent properties, it is extensively suitable to many base materials, supports versatility of products, and is highly adaptable to form coating for most applications.

Particularly, it has high adhesion to various base materials, so the resulting coating films can pass strict cross-cut test with a 100% not-coming-off result. Its film hardness by pencil test in accordance with ASTM D3363 is up to 5H and has high gloss.

d) 0.1-30 parts of additives, being at least one selected from the group consisting of a leveling agent, a wetting agent, a defoaming agent, an anti-mildew agent, a stabilizer, an antibacterial agent, an antioxidant, a dispersant, a matting agent, a thixotropic agent, an adhesion promoter and a thickener; and
    e) 0-50 parts of a pigment;
    wherein the waterborne acrylic emulsion is formed from performing emulsion polymerization on the following reactive monomers, based on a total weight of all the reactive monomers sum up to 100 wt %:
        a1) 65-76 wt % of an alkyl-group-containing acrylate;
        a2) 8-10 wt % of a hydroxyl-group-containing acrylate;

a3) 1-4 wt % of a carboxyl-group-containing acrylic acid;
a4) 2-7 wt % of a hydroxyl-group-containing acrylic polyester (polyether) polyol, selected from any one of a hydroxyl-group-containing acrylic polyester polyol, a hydroxyl-group-containing acrylic polyether polyol or a blend thereof; and
a5) 13-20 wt % of a acrylate containing alkene-based unsaturated functional groups.

2. The waterborne coating of claim 1, wherein the alkyl-group-containing acrylate is any one or a blend of two or more selected from the group consisting of methyl methacrylate (MMA), ethyl acrylate (EA), propyl acrylate (PA), n-butyl acrylate (BA), isobutyl acrylate (IBA), pentyl methacrylate, hexyl methacrylate, heptyl methacrylate, octyl methacrylate, 2-ethylhexyl methacrylate (2-EHMA), n-octyl methacrylate (OA), iso-octyl methacrylate (IOA), nonyl methacrylate (NA), decyl methacrylate, lauryl methacrylate (LA), octadecyl methacrylate, methoxyethyl methacrylate (MOEA), n-butyl methacrylate (n-BMA), 2-ethylhexyl acrylate (2-EHA), and (methyl) ethoxy methacrylate (EO-MAA).

3. The waterborne coating of claim 1, wherein the hydroxyl-group-containing acrylate is any one or a blend of two or more selected from the group consisting of 2-hydroxyethyl methacrylate (2-HEMA), 2-hydroxyethyl acrylate (2-HEA), 4-hydroxybutyl acrylate (4-HBA), 2-hydroxy-3-chloropropyl acrylate and diethylene glycol methacrylate (DGEMMA).

4. The waterborne coating of claim 1, wherein the carboxyl-group-containing acrylic acid is any one or a blend of two or more selected from the group consisting of acrylic acid (AA), methacrylic acid (MAA), maleic acid (MA), fumaric acid (FA), itaconic acid (IA), and butenic acid (BA).

5. The waterborne coating of claim 1, wherein the acrylate containing alkene-based unsaturated functional groups is added for any one or a blend of two or more selected from the group consisting of methacrylonitrile (AN), diacetone acrylamide (DAAM), N-hydroxypropyl acrylamide (N-MAAM), cyclohexyl methacrylate (CHMA) and methacrylic acid isobornyl methacrylate (IBOMA).

6. The waterborne coating of claim 1, wherein the hydrophilic cross-linking agent is one selected from the group consisting of hydrophilic isocyanate-based compounds, hydrophilic epoxy compounds, amine-based compounds, metal chelating compounds and aziridine-based compounds.

7. The waterborne coating of claim 6, wherein the hydrophilic cross-linking agent is a hydrophilic isocyanate-based compound, the hydrophilic isocyanate-based compound is a product of an addition reaction between isocyanate monomer and trimethylolpropane (TMP), and the isocyanate monomer is selected from the group consisting of toluene diisocyanate, chlorophenyl diisocyanate, hexamethylene diisocyanate, tetramethylene diisocyanate, isophorone diisocyanate, xylylene diisocyanate, methylenediphenyl diisocyanate, hydrogenated methylenediphenyl diisocyanate, and a combination thereof.

8. The waterborne coating of claim 1, wherein the coalescing agent is any one or a blend of two or more selected from the group consisting of propylene glycol monomethyl ether (PM), dipropylene glycol monomethyl ether (DPM), tripropylene glycol methyl ether (TPM), 1-propoxy-2-propanol (PnP), propylene glycol n-butyl ether (PnB), dipropylene glycol n-butylether (DPnB), tripropylene glycol n-butyl ether (TPnB), propylene glycol monomethyl ether acetate (PMA), dipropylene glycol monomethyl ether acetate (DPMA), dipropylene glycol dimethoxy ether (DMM), 2-butoxyethanol (EB) and butyl diglycol (DB).

9. The waterborne coating of claim 1, wherein the pigment is one or more selected from titanium dioxide colors, chromium-based colors, iron oxide colors, an arkansite, a carbon black, azo colors and phthalocyanine colors.

10. A process for producing the waterborne acrylic emulsion of claim 1, comprising the following steps, based on 100 parts by weight of the total monomers:
a) preparing a first hydrophilic initiator aqueous solution by taking 0.3 parts of sodium persulfate to dissolve in 2 parts of deionized water;
b) preparing a first reaction tank and putting 90 parts of deionized water, 0.6 parts of sodium hydrogen carbonate, and 0.8-2.3 parts of emulsifier into the tank, heating the tank reached to temperature of 78° C. and then adding the first hydrophilic initiator aqueous solution of step a) into the tank and mixing for 20 more minutes;
c) preparing a second reaction tank and putting the following material into the tank and mixing them into a pre-emulsion having a C=C double bond structure through a mixer:
35 parts of deionized water, 1.0-2.5 parts of an emulsifier, 49-60 parts of methyl methacrylate (MMA), 0-25 parts of n-butyl methacrylate (n-BMA), 2-7 parts of 2-ethylhexyl acrylate (2-EHA), 4-6 parts of butyl acrylate (BA), 8-10 parts of 2-hydroxyethyl methacrylate (2-HEMA), 0-2 parts of 2-hydroxyethyl acrylate (2-HEA), 2 parts of acrylic acid (AA), 1 part of methacrylic acid (MAA), 0-2 parts by hydroxyl acrylic polyester (polyether) polyol, 0-14 parts of styrene (SM), 0-6 parts of methacrylic acid isobornyl methacrylate (IBOMA), 0-4 parts of cyclohexyl methacrylate (CHMA), and 0-1 parts by diacetone acrylamide (DAAM);
d) preparing a second hydrophilic initiator aqueous solution by taking 0.4 parts of sodium persulfate to dissolve in 17.5 parts of deionized water;
e) adding 24 parts of the pre-emulsion of step c) into the first reaction tank, and letting reaction run for 30 minutes to form a seeded emulsion; and
f) dropwise adding the remaining pre-emulsion of step c) into the first reaction tank kept the temperature held at 78° C., letting reaction run for 2 hours; and
g) dropwise adding second hydrophilic initiator aqueous solution of step d) into the first reaction tank of step f) within 2 hours, letting reaction run for another 2 hours, and cooling the first reaction tank to 40° C. or below; and adding ammonia to neutralize the solution to pH 7-8, cooling to the ambient temperature, thereby obtaining the waterborne acrylic emulsion containing a solid constituent up to 42%.

11. The process for producing a waterborne acrylic emulsion of claim 10, wherein the pre-emulsion of step c) is a reactive emulsifier having a C=C double bond structure.

* * * * *